US008624843B2

United States Patent
Ku

(10) Patent No.: US 8,624,843 B2
(45) Date of Patent: Jan. 7, 2014

(54) KEYBOARD APPARATUS INTEGRATED WITH COMBINED TOUCH INPUT MODULE

(76) Inventor: Allen Ku, Walnut, CA (US)

( * ) Notice: Subject to any disclaimer, the term of this patent is extended or adjusted under 35 U.S.C. 154(b) by 180 days.

(21) Appl. No.: 13/267,076

(22) Filed: Oct. 6, 2011

(65) Prior Publication Data

US 2012/0026096 A1    Feb. 2, 2012

Related U.S. Application Data

(63) Continuation-in-part of application No. 12/222,618, filed on Aug. 13, 2008, now abandoned.

(51) Int. Cl.
*G06F 3/02*    (2006.01)

(52) U.S. Cl.
USPC .......... 345/168; 345/156; 345/173; 178/18.05

(58) Field of Classification Search
USPC ......... 345/156, 157, 160, 168, 173, 174, 179; 178/18.05, 18.06, 19.04; 341/22; 715/702
See application file for complete search history.

(56) References Cited

U.S. PATENT DOCUMENTS

| 5,883,622 | A * | 3/1999 | Chan et al. | 345/173 |
| 6,560,612 | B1 * | 5/2003 | Yamada et al. | 1/1 |
| 2003/0122774 | A1 * | 7/2003 | Harada | 345/156 |
| 2007/0040812 | A1 * | 2/2007 | Tang et al. | 345/173 |
| 2007/0126714 | A1 * | 6/2007 | Imamura | 345/173 |

FOREIGN PATENT DOCUMENTS

JP    2000137571 A   *   5/2000

* cited by examiner

*Primary Examiner* — Koosha Sharifi-Tafreshi
(74) *Attorney, Agent, or Firm* — Mei & Mark LLP

(57) ABSTRACT

A keyboard apparatus integrated with a combined touch input module is disclosed. The combined touch input module having a touchpad module and a tablet module conducts a handwriting mode and a cursor mode for the keyboard apparatus. According to one of the embodiments, a keyboard controller for processing and transferring keystroke signals is included. The keyboard controller also performs the interpretation of the signals generated in the touch input module, which is integrated into the keyboard for providing both touching and handwriting functions. Further, a mode switching circuit, in response to user's operation, is used to switch the touch input module to the handwriting mode or the cursor mode. A micro controller within the touch input module is included to process the input signals generated by the touchpad and tablet modules.

10 Claims, 6 Drawing Sheets

KEYBOARD APPARATUS INTEGRATED WITH COMBINED TOUCH INPUT MODULE

CROSS-REFERENCE TO RELATED APPLICATION

This U.S. Non-provisional Application for Patent is a continuation-in-part application of patent application Ser. No. 12/222,618 filed on Aug. 13, 2008, currently pending. The entirety of the above-mentioned patent applications is hereby incorporated by reference herein and made as a part of this specification.

BACKGROUND OF THE INVENTION

1. Field of the Invention

The present invention relates to a keyboard apparatus integrated with a combined touch input module, and more particularly to the keyboard apparatus integrating a touchpad module and a tablet module that supporting touching control and handwriting.

2. Description of Related Art

Keyboard and mouse are the most often used devices for computer input in general. With the development of the application software and a variety of the computer peripherals, a handwriting method or a mouse-like touch device further enhance the input way. Since the number of peripherals connected to computer systems is increasing, the connecting cables for the peripherals will more and more clutter computer tables.

Concerning the use of keyboards, users need to know well the arrangement of the keys for inputting data efficiently. Thus, a handwriting method can be a convenient input method for users who are bad at keyboard input. Reference is made to FIG. 1 which shows a schematic diagram of a computer system adopting a handwriting device. The shown keyboard 10 and handwriting device 14 connect with the computer system 12 at one time. The computer system 12 preferably supplies power to the keyboard 10 and handwriting device 14. The user uses a stylus 16 to write on a tablet of the handwriting device 14. Through the software installed in the computer system 12 tracks retrieved from the handwriting device 14 are recorded, and the tracks are recognized with a text-recognition program. Finally, the recognized text can be converted to normal text format.

FIG. 2 shows a conventional keyboard apparatus integrated with a touch pad mounted on a laptop. Besides the computer mouse as a used input device, the touch pad can be another often used cursor-controlled device, especially for a portable notebook computer. The shown computer system 20 is a notebook computer, wherein a touch sensitive module 24 is mounted on the keyboard module 22—including the touch pad for hand controlling the cursor.

Accordingly, as discussed above, the prior art still has some non-convenient disadvantages that could be improved. The present invention aims to resolve the drawbacks in the prior art.

SUMMARY OF THE INVENTION

For providing an approach of integration of the input peripherals including a handwriting device and a touch sensitive control device to a keyboard apparatus, disclosed herein is a keyboard apparatus integrated with a combined touch input module.

The preferred embodiment of the keyboard apparatus integrated with a combined touch input module includes a keyboard controller used for processing the input/output signals of the keyboard apparatus, and used to convert the scan code received from a keyboard scan circuit. The keyboard controller also handles the signals from the touch input module. The touch input module operatively combines a touchpad module and a tablet module. A micro controller included in the touch input module is used to process the signals generated by those input modules. The signals are transmitted to the computer system through a communication unit of the apparatus. The combined touch input module shares the power supply with the original keyboard circuit.

In accordance with the present invention, the touch input module conducts a cursor mode or a handwriting mode by respectively activating the touchpad module or the tablet module. The touch input module includes some essential components, including a micro controller connected with the keyboard controller for converting signals and generating the touch control signals, and then delivering the touch control signals; a touchpad module, electrically connected with the micro controller via a touch-sensing circuit, for sensing a touch event through a touch panel in the cursor mode; a tablet module, electrically connected with the micro controller via a signal-tracking circuit, for sensing a handwriting event through a sensor board in the handwriting mode; and a mode switching circuit, electrically connected with the micro controller, for switching the cursor mode or the handwriting mode in response to a switch signal made by the key array.

Structurally, within the touch input module onto the keyboard apparatus, the touchpad module is situated above the tablet module. The touchpad module is mechanically made of a first conductive layer, an insulator layer, and a second conductive layer. The tablet module is mechanically made of a scratch-resistant layer, a sensor board, and a substrate. Further, the touch input module has a protective cover exposed outside the apparatus.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The present invention is illustrated with a preferred embodiment and attached drawings. However, the invention is not intended to be limited thereby.

The present invention relates to a keyboard apparatus integrated with a combined touch input module. The combined touch input module is a more convenient and integral input device, and is functioned in a handwriting mode or a cursor mode. The appearance of the combined touch input module is a normal touch pad mounted on the keyboard apparatus, but it integrates the handwriting function by means of a mode switching circuit.

Figure 1:
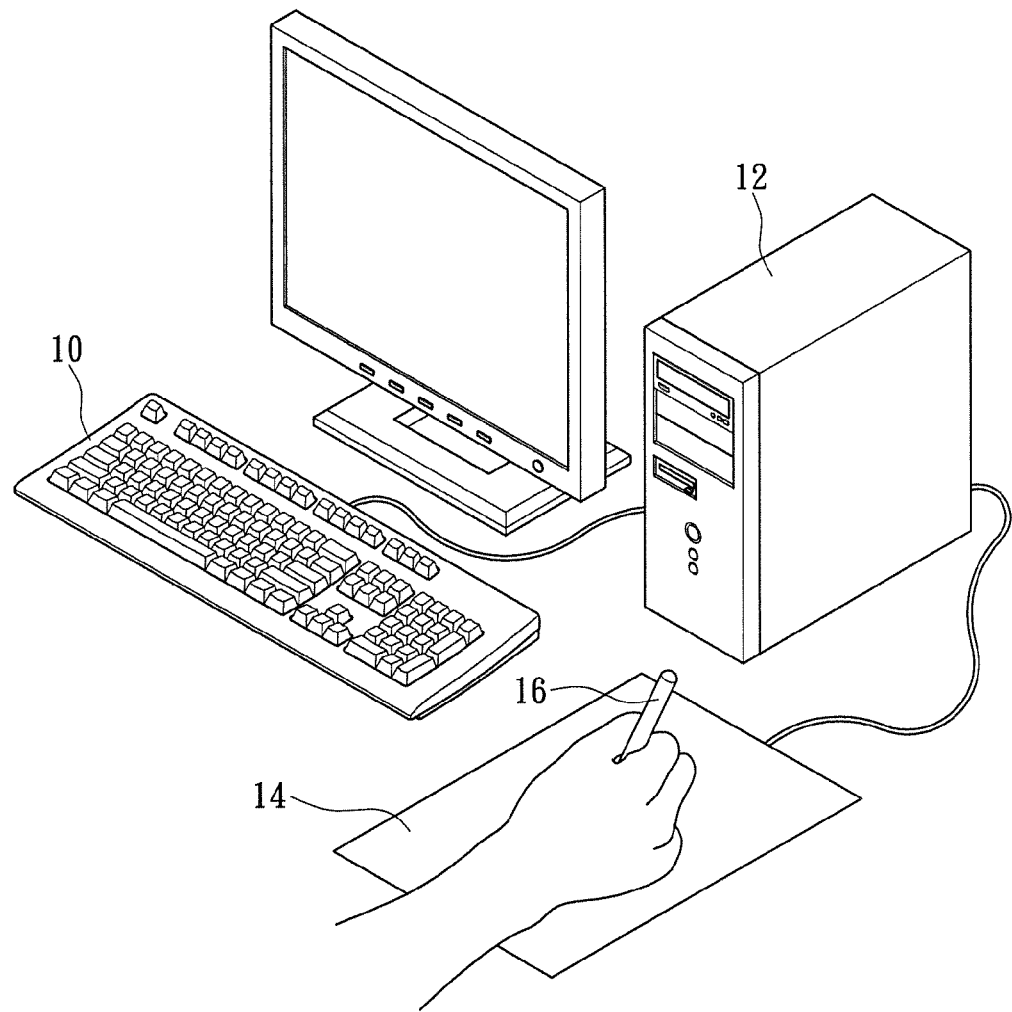
FIG. 1 is a schematic diagram of a conventional computer system applying the handwriting device.
Figure 2:
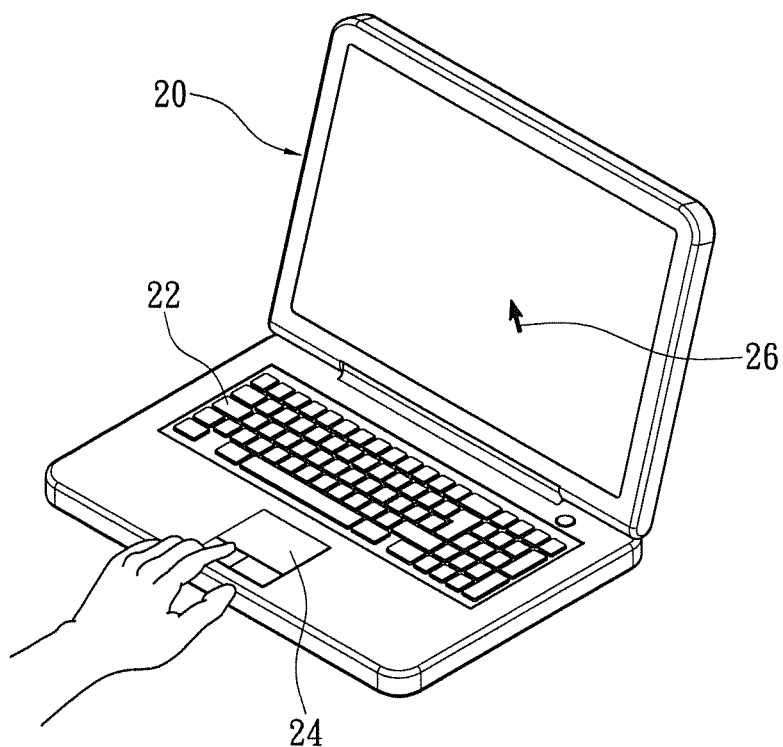
FIG. 2 shows a conventional keyboard apparatus integrated with a touch pad.
Figure 3:
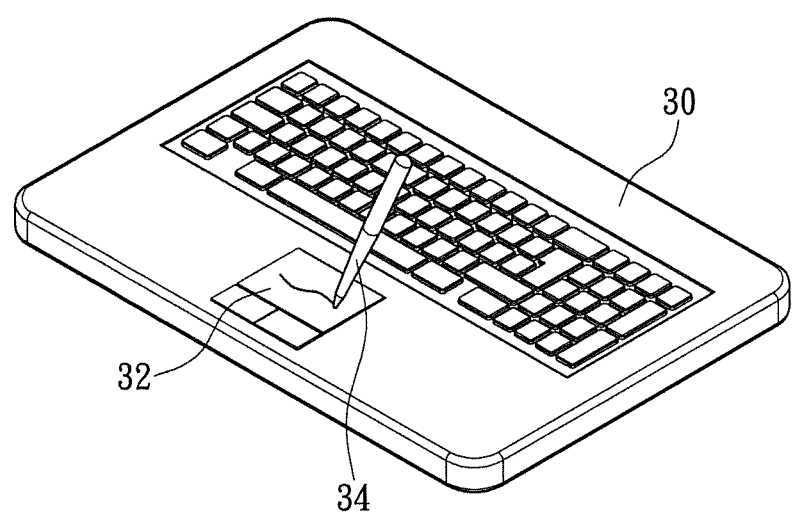
FIG. 3 shows an embodiment of the keyboard apparatus integrated with a combined touch input module of the present invention.

Reference is made to FIG. 3 showing a schematic diagram of the keyboard apparatus integrated with the combined touch input module of the preferred embodiment. The shown keyboard apparatus 30 includes a portion of the conventional keyboard in appearance, and also has a touch pad 32. This keyboard apparatus 30 integrates the circuit for the touch pad 32 therewith, the user may thereby manipulate the cursor of the computer system through the touch pad 32. Alternatively, a stylus 34 is further used by the user writing on the touch pad 32.

Figure 5:
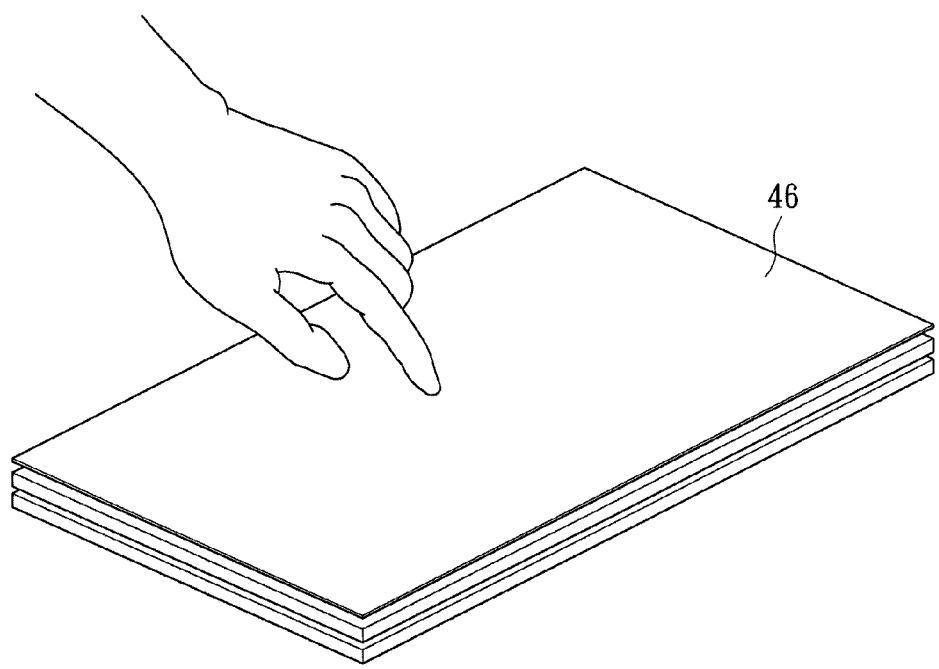
FIG. 5 schematically shows a practice of a cursor mode in accordance with the present invention.

The touch pad 32 can be alternatively driven by resistance-based or capacitance-based touch sensors. According to the working principle of resistance-based touch sensors, the coordinates on an X-Y plane can be obtained in response to a negative voltage change. According to an exemplary example, when the resistance-based touch pad 32 is touched by a user's finger, the inside induced circuit is conducted to generate a sensing signal responsive to voltage's change. Thereby, the relevant coordinates can be found. The related reference is made to FIG. 5 with a touch pad 46 functioned with a cursor mode for controlling the cursor shown on a computer screen using the hand.

More, based on the working principle of the capacitance-based touch sensor, the touch event will change an electric field to generate an electric current, wherein the original electric field is uniformly generated on a glass or other transparent panel with discharged electricity. A micro-controller embedded in the combined touch input module will find the coordinates after calculating the change of the current.

Because the claimed keyboard apparatus is integrated with the combined touch input module, but not the normal keyboard, a driver for the claimed keyboard apparatus is required to be installed in the computer system. The driver may transmit the signals generated from the keyboard apparatus 30, and further switch the functions made by the keyboard. Since the combined touch input module in the keyboard apparatus 30 supports the cursor mode and the handwriting mode, relative control commands may be generated through a mode configuration and the driver. At this moment, the mode switching circuit 421 is used to change the signaling mode between the touchpad module 427 and the tablet module 804 in order to control the cursor or perform the handwriting. The mode switching circuit 421, electrically connected with the micro controller, is used for switching the cursor mode or the handwriting mode in response to a switch signal either made by the key array, or made by the stylus which may be battery-powered to control the mode switching. However, the stylus is able to operate under both the cursor mode and the handwriting mode.

Figure 4:
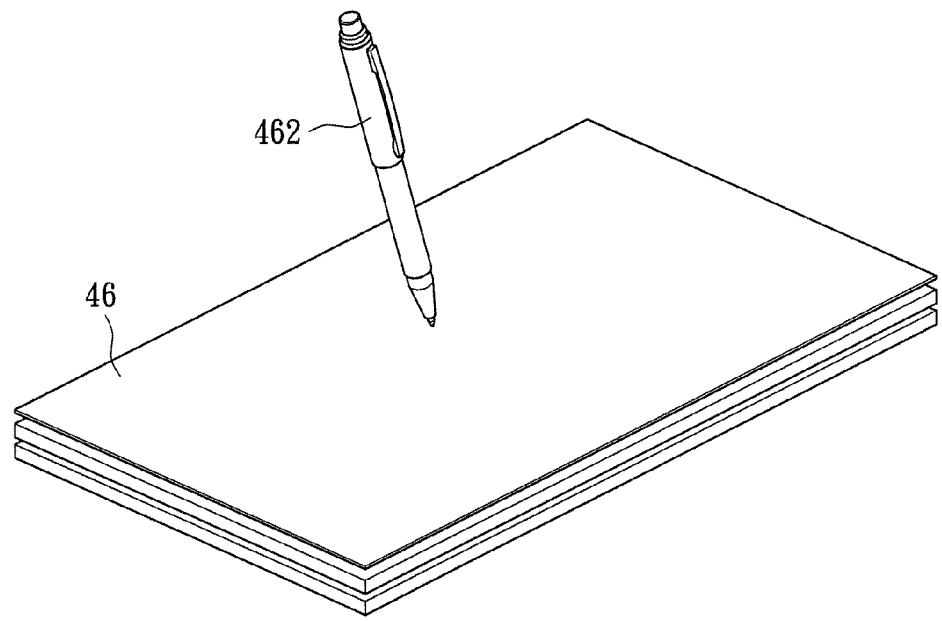
FIG. 4 schematically shows a practice of a handwriting mode switched for the touch input module in accordance with the present invention.

Further reference is made to FIG. 4 showing the user may use a stylus to make handwriting through the mentioned touch pad 32 since the touch pad 32 can be driven by a handwriting mode which is initiated by a tablet module within the keyboard. In the diagram, a stylus 462 is used to generate tracks shown on the computer screen in accordance with the move on the surface of the touch pad 46. In one embodiment to activate the handwriting mode, while the keyboard apparatus is configured to be the handwriting mode, a mode switching circuit within the apparatus is used to switch the keyboard apparatus to the tablet mode. In one aspect, the user may use one preset hotkey or combined keys to activate the function. In another aspect of the handwriting mode, the function can be switched in activation as the touch input module receives a signal triggered by a pressing event made with a stylus.

Figure 6:
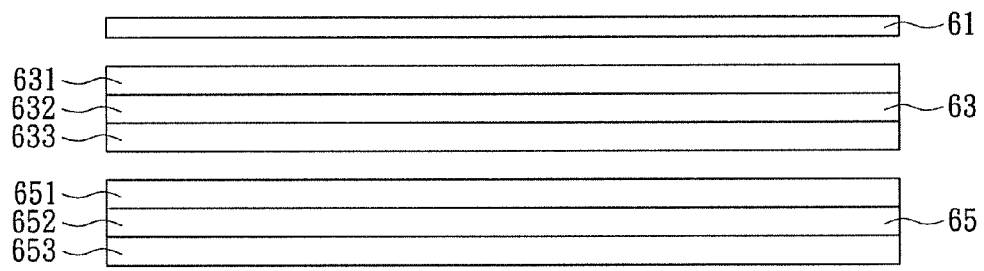
FIG. 6 shows structure of the touch input module in an embodiment of the present invention.

The structure shown in FIG. 6 is based on the combined design to include the touchpad module and the tablet module for initiating the cursor mode or the handwriting mode for the keyboard apparatus.

The diagram shows inside structure within the touch input module which is installed into the keyboard apparatus. The structure of the touch input module has a protective cover 61 exposed outside the apparatus. The protective cover 61 is designed to be a strengthened structure since it should resist the external force such as the pressing by stylus. The protective cover 61 is preferably made by a resilient material to bear the pressure, and also be scratch-resistant and/or waterproof as required. Beneath the protective cover 61, the module includes the touchpad module 63 and the tablet module 65. In particular, the touchpad module 63 is situated above the tablet module 65 within the touch input module which is installed onto the keyboard apparatus. Based on the basic design of the touchpad module 63, it is mechanically made of a first conductive layer 631, an insulator layer 632, and a second conductive layer 633. In one example, the first conductive layer 631 is in charge of x-direction signaling for any touching event, and the second conductive layer 633 is for y-direction signaling for the touch event. The two conductive layers are isolated by the insulator layer 632.

Further, according to one basic configuration, the tablet module 65 is mechanically made of a scratch-resistant layer 651, a sensor board 652, and a substrate 653. In the handwriting mode, when the user uses the stylus or finger to make track onto the surface of the touch input module, the surfaced protective cover 61 receives the tip pressure made by stylus or finger. The sensor board 642 generates the tracking signals as sensing the pressure.

Figure 7:
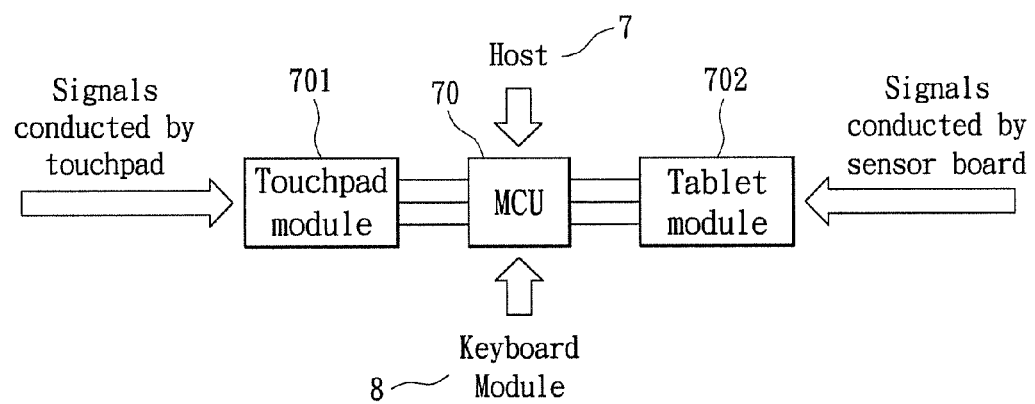
FIG. 7 shows a block diagram describing the combined touch input module of an embodiment in accordance with present invention.

FIG. 7 further shows a block diagram describing the combined touch input module in one embodiment of the present invention. A micro control unit (MCU) 70 is disposed within the touch input module. The micro control unit 70 is a processing center between the host 7, the keyboard module 8, and the integrated touch input module. The touch input module in an exemplary example includes two further modules, such as the touchpad module 701 for conducting the touch signals for the cursor mode, and the tablet module 702 for sensing the tracking signals for the handwriting mode. The micro control unit 71 is therefore electrically connected with the touchpad module 701 and the tablet module 702 for handling the signals either from the touchpad or the sensor board of the tablet module 702.

Figure 8:
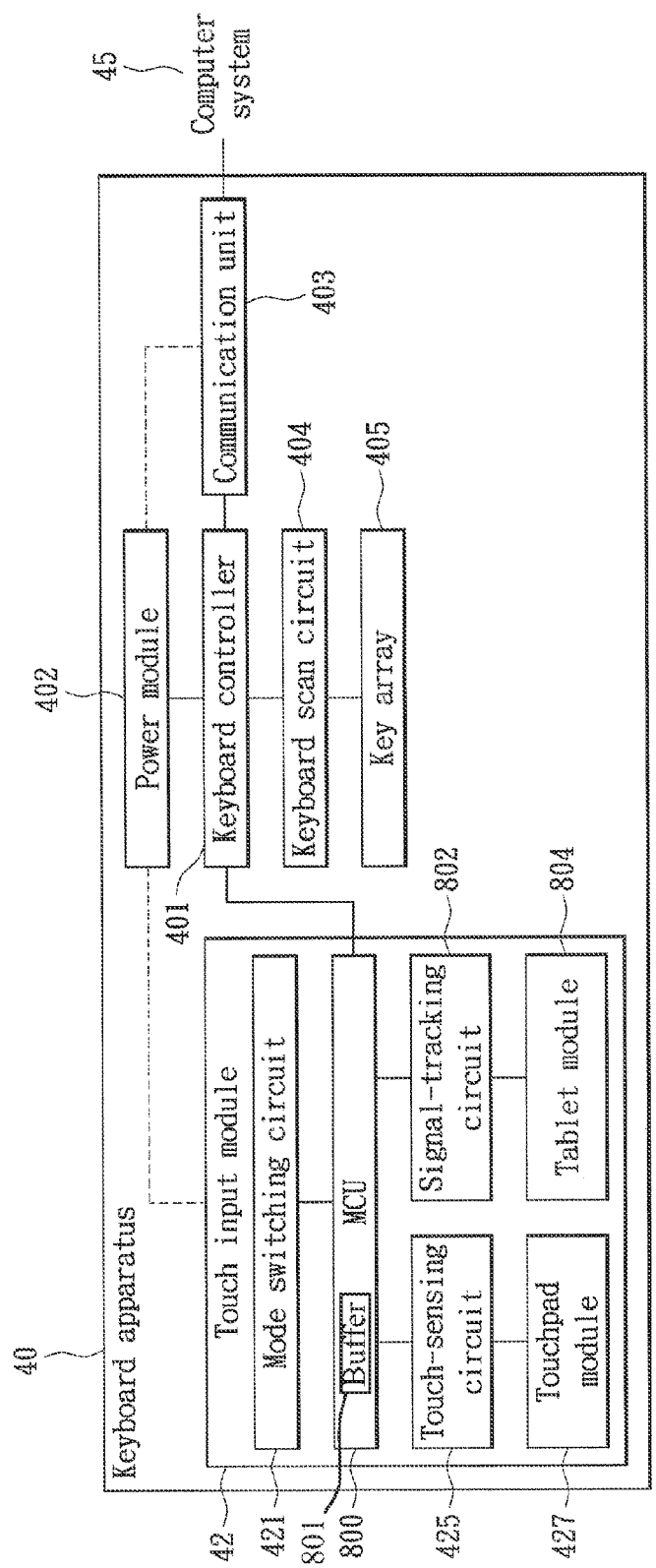
FIG. 8 shows a circuitry block diagram of the keyboard apparatus of the present invention.

FIG. 8 shows the circuitry blocks of the preferred embodiment of the keyboard apparatus. The shown keyboard apparatus 40 may roughly be distinguished into a conventional keyboard module and the invention-claimed touch input module 42. The portion of the conventional keyboard module at least includes a keyboard controller 401, a power module 402, a communication unit 403, a keyboard scan circuit 404 and a key array 405. The portion of the touch input module 42 at least has a mode switching circuit 421, a micro controller 800, a touchpad function having a touch-sensing circuit 425 and a touchpad module 427, and a tablet function having a signal-tracking circuit 802 and a tablet module 804.

The mentioned keyboard controller 401 is used to process the input/output signals of the keyboard apparatus 40, and also the signals of the touch input module 42 as connected with the micro controller 800. Essentially, the keyboard controller 401 is to convert the scan code received from the keyboard scan circuit 404 in the key array 405, and to transmit the code to the computer system 45 via the communication unit 403. The keyboard controller 401 is also to process the signals generated from the touch input module 42, and then send the signals to the computer system 45. The communication unit 403 electrically connects with the keyboard controller 401 including wiring to the micro controller 800, and outputs the signals generated by the keyboard apparatus 40 or the touch input module 42 to the computer system 45 via a specific communication port (such as USB, PS/2) or any other wireless or wired communication technologies.

The touch input module 42 electrically connects with the keyboard controller 401, and shares the power supply and the external communication port of the keyboard apparatus. The shared external communication port is preferably implemented by wired or wireless manner connected to the computer system 45. Since the touchpad module 427 receives a touch event under the cursor mode made by user's finger or stylus, the touch-sensing circuit 425 responsively generates induced signals. More, the tablet module 804 is electrically connected with the micro controller via the signal-tracking circuit 802 for sensing a handwriting event through a sensor board under the handwriting mode. In the selected mode, the signal-tracking circuit 802 generates the tracking signals as the tablet module 804 senses the external pressing force, such as made by the finger or stylus. After that, the micro controller 800 calculates the coordinates made by the touch event, and converts them to a control signal. The control signal is then transmitted to the computer system 45 by the keyboard controller 401.

More particularly, through the driver for the keyboard, the user may select a touch mode made by the touch input module 42 having the cursor mode and the handwriting mode. After the command for switching the modes is received by the mode switching circuit 421 of the touch input module 42, an operating mode of the touch input module 42 is switched by the micro controller 800. At that moment, the micro-controller performs different signals' conversion responsive to the different modes. For example, the micro-controller 800 is required to convert the induced signal to a current cursor's position, such as the X-Y coordinates under the cursor mode. The micro-controller is further required to record the constant touching process sensed by the induced circuit. It is not only required to convert the coordinates, but also to record the handwriting tracks. In this case, a buffer memory is required to store a series of changes of the coordinates during a period of time.

In particular, a program such as the driver in the computer system 45 is used to recognize the tracks as a normal text under the handwriting mode.

The conventional keyboard module and the invention-claimed touch input module 42 jointly share the power supplied by the power module 402. The power module 402 electrically connected to the keyboard controller 401 is mainly to manage the power supply of the keyboard apparatus 40. The touch input module is also electrically connected to the power module 402. The electrical power for the keyboard apparatus 40 is supplied from the computer system 45 through the communication port, or supplied from the independent batteries installed in the keyboard apparatus 40. Therefore, by means of the claimed keyboard apparatus, the cables linked to the computer system 45 can be reduced and also save the power management circuit due to the shared power scheme.

To sum up the description above, the keyboard apparatus with the touch input module integrates the functions fulfilled by a conventional keyboard and a touch input device. The touch input modes include a cursor mode and a handwriting mode. A driver is used to switch the modes. Moreover, an embedded keyboard controller is functioned to receive and process the scan code from the keyboard scan circuit, and to process the signals received from the touch input module. Those signals are sent out through the joint communication unit.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. A keyboard apparatus integrated with a combined touch input module, comprising:
   (a) a keyboard controller configured to process input signals and output signals of the keyboard apparatus, and configured to convert a scan code received from a keyboard scan circuit connected with a key array, and configured to transmit the scan code to a communication unit;
   (b) the communication unit electrically connected to the keyboard controller, the communication unit configured to output touch control signals and scan code to a computer system via a communication port;
   (c) a touch input module electrically connected to the keyboard controller, the touch input module configured to support a cursor mode and a handwriting mode, and configured to transmit touch control signals to the computer system through the keyboard controller and the through the communication unit, the touch input module further comprising:
      (c1) a micro controller, electrically connected with the keyboard controller, the micro controller configured to convert a touch event and a handwriting event and configured to generate the touch control signals, and further configured to transmit the touch control signals;
      (c2) a touchpad module, electrically connected with the micro controller via a touch-sensing circuit, the touchpad module configured to sense the touch event through a touch panel in the cursor mode;
      (c3) a tablet module, electrically connected with the micro controller via a signal-tracking circuit, the tablet module configured to sense the handwriting event through a sensor board in the handwriting mode; and
      (c4) a mode switching circuit, electrically connected with the micro controller, the mode switching circuit configured to switch between the cursor mode and the handwriting mode in response to a switch signal made by the key array,
   wherein the touch input module, the communication unit, and the keyboard controller jointly use a power supply,
   wherein the keyboard apparatus comprises a single communication port to communicate with the computer system, and
   wherein the touchpad module is layered above the tablet module within the touch input module.

2. The keyboard apparatus of claim 1, wherein the keyboard apparatus further comprises a power module, and the power module electrically connects to the keyboard controller and manages the power for the keyboard apparatus.

3. The keyboard apparatus of claim 2, wherein the touch input module is electrically connected to the power module.

4. The keyboard apparatus of claim 1, wherein the touchpad module is mechanically made of a first conductive layer, an insulator layer, and a second conductive layer.

5. The keyboard apparatus of claim 1, wherein the tablet module is mechanically made of a scratch-resistant layer, a sensor board, and a substrate.

6. The keyboard apparatus of claim 1, wherein the touch input module has a protective cover exposed outside the apparatus.

7. The keyboard apparatus of claim 1, wherein the communication unit communicates with the computer system over wired or wireless communication.

8. The keyboard apparatus of claim 1, wherein the touch input module is configured to record a series of coordinates during a period of time.

9. The keyboard apparatus of claim 1, wherein the mode switching circuit is further configured to switch the keyboard apparatus to the tablet mode when the touch input module receives a stylus signal triggered by a pressing event made with a stylus.

10. The keyboard apparatus of claim 1, further comprising at least one hotkey, wherein the mode switching circuit switches the keyboard apparatus between the cursor mode and the handwriting mode in response to a switch signal made by the key array when the hotkey is pressed.

* * * * *